United States Patent Office 3,165,423
Patented Jan. 12, 1965

---

3,165,423
PROCESS FOR PREPARING WATER-RESISTANT AND VAPOR-PERMEABLE COATED FABRIC
John R. Caldwell and Clarence C. Dannelly, Kingsport, Tenn., assignors to Eastman Kodak Company, Rochester, N.Y., a corporation of New Jersey
No Drawing. Filed Jan. 5, 1961, Ser. No. 80,732
2 Claims. (Cl. 117—135.5)

This invention concerns the preparation of elastomeric vapor-permeable coatings which are waterproof to liquid water and to their use for coating fabrics.

In connection with preparing rainwear and other types of wearing apparel which are intended to be waterproof to liquid water, it has been desirable to provide a material which will transmit water vapor. Various formulations have been suggested for this purpose, one of which has been disclosed in U.S. Patent 2,759,900, issued August 21, 1956, to Caldwell et al. which discloses the preparation of synthetic resinous compositions prepared by polymerizing an acrylic acid ester while admixed with carboxy alkyl cellulose ethers.

Various other polymeric compositions have been used for waterproofing fabrics such as those prepared from acrylic acid and acrylic acid esters along with other polymerizable materials and the like such as those disclosed in U.S. Patent 2,140,048, issued to Fikentscher et al. However, when many of these polymerizable compositions have been used as sheets, films or coatings on textile fibers, the coated material has been vapor-tight as well as waterproof, and there has been a need for textile coatings for rainwear which would provide a waterproof coating but which would enable water vapor to pass through the fabrics. At the same time it is desirable that the textile coating be resistant to solvens ordinarily used in dry cleaning as well as resistant to soaps and detergents, so that the rainwear would not require a subsequent recoating after each dry cleaning.

Some of the coatings which have been developed in the past which were waterproof to liquid water and which transmitted water vapor have not been satisfactory for coating fabrics due to the stiffening action which was imparted to the materials and which rendered them unsuitable for wearing purposes.

We have discovered a coating composition which can be used for coating fabrics in order to render the material waterproof to liquid water and yet will pass water vapor. In addition to this desirable characteristic, the material so coated is flexible and has good wearing characteristics.

One object of this invention is to provide an elastomeric liquid-waterproof film which is permeable to water vapor. Another object of this invention is to provide a method of coating fabrics, so that they will be waterproof to liquid water and yet transmit water vapor. A further object is to provide a waterproofing material for textile fabrics which renders the material flexible and yet is resistant to removal by dry cleaning solvents. A further object is to provide a method of preparing a polymeric composition comprising an elastomeric material containing hydrophilic polymeric pigments. An additional object of the invention is to provide methods of preparing waterproof films that contain cross-linked polymers which have polar hydrophilic groups such as amide groups.

The objects of this invention are accomplished by suspending hydrophilic polymer pigments in aqueous or organic liquid suspensions of various elastomeric materials or in organic solutions of various elastomeric materials. These suspensions or solutions are used to cast films and to impregnate or coat textile fabrics, leather, and paper, and may be improved by adding curing agents, plasticizers, stabilizers, and the like. The films and coated fabrics, leather and paper are water vapor-permeable but remain waterproof.

The ability of the elastomeric coatings to transmit water vapor is due to the presence of certain hydrophilic organic pigments which are added to the suspensions or solutions of elastomeric materials.

These hydrophilic, cross-linked polymers in pigment form are derived from soluble polymers that contain certain polar groups. The polar groups in the organic pigments are those which show a strong affinity for water, such as amide groups. The polymers that have these polar groups are obtained by polymerizing and copolymerizing vinyl monomers that contain one or two amide groups.

Polymers and copolymers containing acrylamide, N-substituted acrylamides, methacrylamide, N-substituted methacrylamides, fumaric amide, N-substituted fumaric amides and similar unsaturated amide compounds are useful. These soluble polymers are then cross-linked and converted to the insoluble form by reaction with formaldehyde. Other cross-linking agents used in the process of the invention are the polymethylol compounds obtained by reacting formaldehyde with urea, melamine or phenols under alkaline conditions. The cross-linked pigments are described in detail in copending application Serial No. 836,895, filed August 31, 1959, now abandoned.

The elastomeric, waterproof film can be defined as any elastomeric material which can be dissolved in an organic liquid and which will give a continuous film when the solvent is evaporated and as any elastomeric material which can be suspended in water or an organic liquid and which will give a continuous film when the suspending medium is evaporated. The elastomeric materials which are included within the scope of this invention are listed as follows:

(1) Butadiene polymers: Copolymers of butadiene with acrylonitrile, styrene and esters of acrylic acid.
(2) Polyvinyl acetals: Acetals of polyvinyl alcohol made with higher aldehydes such as butyraldehyde, 2-ethyl hexaldehyde and heptaldehyde.
(3) Vinyl polymers: Homopolymers and copolymers such as those made from vinyl chloride, esters of acrylic acid, esters of methacrylic acid, and vinyl acetate.
(4) Chloroprene: Polymers and copolymers of chloroprene with acrylonitrile, styrene, and esters of acrylic esters.
(5) Diisocyanate-linked condensation elastomers: Diisocyanates such as toluene diisocyanate reacted with relatively short linear polyester molecules to form polyurethanes and polymers produced from the reaction of diisocyanates with diamines such as 3,3′(2,2-dimethyltrimethylenedioxy) bis propyl amine.
(6) Cellulose esters: Cellulose esters such as cellulose acetate, cellulose propionate and cellulose acetate butyrate.

When the film-forming elastomer is used as a suspension, water or an organic liquid may be used as the suspending medium. When the elastomer is used as a solution, an organic solvent may be used. Since this organic solvent is not critical, it may be chosen from any number of organic solvents which are commercially available and economically feasible to use in this process.

When the elastomer is used as a suspension, the solids may constitute any percent of the total suspension but a high percent solids is usually desirable. The preferred range is 5%–80% solids. This range of 5%–80% is also preferred when the elastomer is used in a solution.

Although a wide range of organic pigments may be used according to our invention, we prefer those made from polymerizable monomers containing amide groups such as acrylamide, N-substituted acrylamides, vinyl lactams, fumaric amide, and substituted fumaric amide and polymerizable monomers containing hydroxyl groups such as 2-hydroxyethyl acrylate, 2-hydroxypropyl acrylate and allyl alcohol.

When a film-forming latex of the elastomeric material is used, the organic pigment may be suspended in the latex directly or suspended in water and then added as a water suspension. The organic pigment can be added so as to constitute any part of the dry film. The desired range is 5%–60% based on the dry film or coating.

In addition to organic hydrophilic pigments, other materials may be added to the latices to improve the appearance or physical properties of the coating. These materials are curing agents such as sulfur, zinc oxide, and rubber-type accelerators; thermosetting resins such as urea-formaldehyde, melamine-formaldehyde and phenolic; plasticizers such as dioctyl phthalate, dioctyl adipate tricresyl phosphate, and dibutyl phthalate; stabilizers such as phenyl-$\beta$-naphthylamine, zinc oxide and triphenyl phosphite; colored pigments; and flame-resisting agents such as antimony trioxide and tricresyl phosphate.

After all of the desired materials have been added to the latex, it can be coated on metal surfaces, on textile fabrics, leather, or paper. Multiple coats may be used if desired. The amount of dry coating used to waterproof a particular material is dependent on the nature of the material. Usually a fabric will become waterproof if the coating is applied in two coats to provide a dry coating which weighs 1 ounce per square yard. However, any amount that is desired may be applied and any number of coating operations depending upon the use for which the material is intended.

The desired range of the dry coating is 0.25–10.0 ounces per square yard. The coating may be deposited on the surface on one or both sides of the fabric or the material may be impregnated so that each fiber is coated. After the final coating has been applied, the coated material is heated to cure the coating. The temperature and time of heating is dependent on the particular elastomer, curing agents, and resins that are used. The cured film or coating will withstand a 6-foot head of water. The rate of water vapor transmission of these coatings is a function of the amount of organic hydrophilic pigment which they contain and varies from 5 to 100 g./m.$^2$/hr., if the coatings contain 5–60% organic pigment. For apparel use, it has been found that a minimum transmission rate of approximately 25 g./m.$^2$/hr. is preferred in order to provide maximum comfort to the wearer under most climatic conditions. This rate is attained if the coating contains about 20–50% of the pigment. Higher rates of water vapor transmission are obtained with concentrations of pigment greater than about 50% but some loss in the wet strength of the coating results.

When the elastomer is dissolved in an organic liquid, the organic pigment may be added to it as suspension in more of the same organic solvent or may be added directly to the elastomer dissolved in the organic solution, and dispersed by suitable agitation. The properties of the final film may be improved in some cases by the addition of curing agents, plasticizers, stabilizers, colored pigments, thermosetting resins, and flame-resisting agents as illustrated above for elastomeric suspensions.

The coating dope composed of organic liquid, elastomer, hydrophilic organic pigments and any desired modifiers can be coated to give waterproof vapor-permeable films or coatings by evaporating the organic liquid. When a curing agent is used, the film can be cured by heating. The final dry film may be composed of from 15–60% hydrophilic organic pigment. The desired range is from 25–50%. The amount of coating which is applied to the material is dependent on the ultimate use of the coated material, but a coating of 1 ounce per square yard of material is usually enough to make the material waterproof. Coatings of 0.25–10.0 ounces per square yard represent the desired range.

The final coated materials can withstand a 6-foot head of water and in common with the coatings deposited from a suspension, the vapor transmission rate is dependent on the amount of hydrophilic pigment in the film or coating ranging from 5 to 100 g./m.$^2$/hr. if the coatings contain 5–60% organic pigment when the relative humidity is 50% on one side of the film or coated fabric and 100% on the other side. Water vapor transmission rates of 25 to 40 g./m.$^2$/hr. are sufficient for rainproof wearing apparel.

In the practice of our invention, the dry films may be treated with solvents for the elastomer to improve the gloss or adhesion. The coated materials can be calendered before or after curing to improve the surface and appearance of the product. The following examples are intended to illustrate the practice of our invention but are not intended to limit it to these particular embodiments:

*Example 1*

200 g. of the polymer made from acrylamide was dissolved in 2000 g. of water. This solution was adjusted to pH 8 with sodium hydroxide and the solution was heated to 60° C. 20 g. of formaldehyde was added as a 35% solution in water. Heating was continued for 30 minutes and the solution was cooled to 25° C. 10 g. of dibasic ammonium phosphate was added and the final solution was spray dried. The spray drying equipment was manufactured by Bowen Engineering, Inc., Garwood, New Jersey, and was equipped with an atomizer-type nozzle. The nozzle had an orifice of 0.05 inch and air at 150 p.s.i. was used to atomize the polymer solution. The polymer solution was atomized into droplets in the heated chamber where the drying air was maintained at 155° C. The air in the drying chamber was circulated to hold the polymer in suspension for 1 minute. At the end of this time, the dry polymer in the form of a very fine powder was separated by a cyclone separator. The polymer particles were measured and were found to be from 0.5 to 5 microns in diameter. The polymer was treated with water and was found to be insoluble. However, the particles were readily suspended by the water to give a low viscosity suspension when the solids composed 50% of the suspension.

These polymer particles were mixed with a neoprene solution in toluene to give a viscous coating solution. This solution was composed of 60% toluene, 20% neoprene, 10% polymer particles as prepared above, 7% water, and the remaining 3% was composed of curing agents, accelerators, and plasticizers. The solution was coated on nylon fabric weighing 1.25 oz./yd.$^2$. The coating was applied in a manner so as to provide a dry cured coating weight of 1.12 oz./yd.$^2$. This coated fabric was waterproof under a 6-foot head but transmitted water vapor at the rate of 32.1 g./m.$^2$/hr. if the air on one side of the fabric was saturated with water vapor at 75° F. and the air on the other side was 50% saturated.

*Example 2*

200 g. of the copolymer having the composition 43% vinyl acetate and 57% fumaramide was dissolved in 1000 g. of water. 10 g. of trioxane and 1 g. of phosphoric acid were added. This mixture was spray dried using the spray dryer described in Example 1. Air at 100 p.s.i. was used to generate the spray and the air in the drying chamber was maintained at 180° C. The droplets were suspended in the heated chamber for 1 minute. The copolymer was obtained as a dry powder which was composed of particles that measured 0.5–3 microns in diameter.

These particles were cross-linked and insoluble since they were not soluble in hot water, dimethylformamide, or ethylene glycol. However, the particles were readily suspended by these liquids to give relatively nonviscous suspensions containing up to 60% solids.

100 g. of this polymer was mixed with 100 g. of water to give a heavy paste. This paste was then mixed with 100 g. of polyvinyl butyral dissolved in 100 g. dibutyl phthalate, 350 g. toluene and 350 g. ethanol. This mixture was coated on cotton fabric to give a coating weight of 2.1 oz./yd.$^2$. The coating transmitted water vapor at the rate of 35 g./m.$^2$/hr. with a vapor pressure difference of 11.58 mm. Hg pressure. This coated fabric was suitable for use as raincoats, tents, and tarpaulins. It was waterproof under a 6-foot head of water.

*Example 3*

500 g. of the copolymer having the composition 78% N,N-dimethylacrylamide and 22% acrylamide was dissolved in 3000 g. of acetone. 50 g. of trioxane and 10 g. of phosphoric acid were dissolved in the acetone. This mixture was spray dried as described in Example 2 using the same conditions of temperature and air pressure.

The product was a dry powder which was composed of particles that measured 0.2–2 microns in diameter. These particles were no longer soluble but could be readily suspended in a wide variety of organic liquids such as alcohols, esters, ketones, and hydrocarbons. These suspensions could be filtered through paper without substantially changing the composition.

These cross-linked particles were dispersed in a neoprene solution using the same technique described in Example 1. The resulting dope was coated on nylon, cotton, and Dacron fabrics. After curing, these coatings withstood a 6-foot head of water but transmitted water vapor at the rate of 33.2 g./m.$^2$/hr.

*Example 4*

200 g. of poly-N,N-dimethylacrylamide was dissolved in 1000 g. of water. 40 g. of polymethacrylamide was dissolved in this solution and 15 g. of formaldehyde was added. This solution was adjusted to pH 8 with sodium hydroxide and 2 g. dibasic ammonium phosphate was added. This mixture was heated to 60° for one hour and then cooled to 25° C.

A sample of this solution was heated to 95° C. for 3 hours and a cross-linked insoluble gel was obtained.

The remainder of the solution was spray dried as described in Example 1. The product was a fine powder which was composed of particles that measured 1–5 microns in diameter. These particles were not soluble in water, dimethylformamide, or methyl alcohol.

This polymer was used to make water vapor permeable coatings using the technique described in Example 1. Neoprene, polyvinyl butyral, and GRS rubber were modified with this polymer. The final coatings contained 35% of the hydrophilic cross-linked polymer. The coatings transmitted water vapor at the rate of 36.7 g./m.$^2$/hr. with a vapor pressure difference of 11.58 mm. Hg at 75° F. They were waterproof to a 6-foot head.

*Example 5*

500 g. of poly-N-isopropylacrylamide was dissolved in 3000 g. of acetone to give a solution which was moderately viscous. 80 g. of a thermosetting resin (Aerotex P-200, made by American Cyanamid Company) was dissolved in the acetone solution. This solution was then spray dried as described in Example 2. The dry powder which was obtained was composed of small particles which measured 1–3 microns in diameter. This powder was heated to 95° C. for 2 hours.

The final product was an insoluble particle that could be suspended in liquids to give suspensions which had a very low viscosity even when the percent solids were as high as 60%. Using the general technique described in Example 1, this hydrophilic polymer was dispersed in polyvinyl butyral coatings on nylon fabric at the 30% level. These coatings transmitted water vapor at the rate of 32.6 g./m.$^2$/hr. with a vapor pressure difference of 11.58 mm. Hg at 75° F. They withstood a 6-foot head of water.

*Example 6*

100 g. of a copolymer having the composition 70% N,N-dimethylacrylamide–30% methacrylamide was dissolved in 1000 g. of water. 20 g. of a water soluble resin made from a condensation of urea and formaldehyde was added. This urea-formaldehyde resin contained reactive methylol groups.

This mixture was spray dried as described in Example 1. A product was obtained which was not soluble in water, ethanol, or acetone. The product was suspended by these liquids and very small particles were obtained.

This product was used to modify neoprene and polyvinyl butyral by adding the spray dried particles to solutions of these elastomers. These solutions were then coated on various fabrics. The coated fabrics were waterproof to a 6-foot head of water, but they were permeable to water vapor. If the elastomers contained 30% (based on the dry weight of the coating) of the spray dried product the water vapor transmission rate was 30 g./m.$^2$/hr. at 25° C. with 100% relative humidity on one side of the fabric and 50% relative humidity on the other side.

*Example 7*

100 g. of the copolymer having the composition 70% N,N-dimethylacrylamide–30% methacrylamide was dissolved in water. 20 g. of a resin made from melamine, formaldehyde and methanol was added and the final solution was spray dried as described in Example 1.

The product was composed of very fine particles of cross-linked insoluble polymer which was useful as a modifier for water-proof elastomers. The product was dispersed in a polyvinyl chloride organosol in an acetone-toluene mixture using the technique described in Example 1. The coatings made from this organosol contained 33% of the hydrophilic polymer and transmitted water vapor at the rate of 31 g./m.$^2$/hr. with a vapor pressure difference of 11.58 mm. Hg.

*Example 8*

30 g. of organic pigment which has the composition 65% N,N-dimethylacrylamide, 10% β-hydroxyethyl acrylate, 15% methyl methacrylate and 10% formaldehyde was suspended in 100 g. of heptane by simple agitation. The suspended particles were 0.1 micron to 10 microns in diameter. 4 g. of zinc oxide, 2 g. of sulfur and 1 g. benzothiazolyl disulfide were added to the suspension. 70 g. of rubber were dissolved in the suspension. The rubber was composed of 70% butadiene–30% acrylonitrile.

The final mixture was coated on cotton, cellulose acetate, and nylon textile fabrics. Two coating operations were made and the increased weight of the fabric due to the coating was 1 ounce per square yard. The coated fabrics were heated to 140° for 5 minutes. The coated fabrics showed a water vapor transmission rate of 35 g./m.$^2$/hr. when the relative humidity was 100% on one side of the fabric and 50% on the other side. The coated fabrics withheld a 6-foot head of water.

*Example 9*

30 g. or organic pigment which has the composition 60% N-isopropylacrylamide, 30% methyl methacrylate, and 10% formaldehyde was suspended in 200 g. isopropyl alcohol. 5 g. of urea-formaldehyde-melamine resin, 70 g. dibutyl sebacate, and 70 g. polyvinyl butyral were dissolved in the pigment suspension. The resulting mixture was coated in three coating operations on cotton, nylon, and cellulose acetate textile fabrics. The coating was applied so that the coating weighed one ounce per square yard. The coated fabrics were heated to 140° C. for 5 minutes, after which the coated fabrics were tested; and it was found that they transmitted water vapor at the rate of 33 g./m.$^2$/hr. when the relative humidity was 100% on one side of the fabric and 50% on the other side. The coated fabrics withheld a 6-foot head of water.

Example 10

40 g. of an organic pigment having the composition 55% N,N-dimethylacrylamide, 10% acrylamide, 10% trimethylolmelamine and 25% methyl methacrylate was suspended in 200 g. of 75% ethyl alcohol 25% water. 70 g. of polyamide composed of 40% nylon 66 and 60% nylon 6 was dissolved in the alcohol water mixture that contained the suspended pigment. 15 g. isododecylphenol was added to the mixture. This final mixture was coated on cotton and nylon fabrics.

The dry coating weighed 1 ounce per square yard, and the coated fabrics transmitted water vapor at the rate of 35 g./m.$^2$/hr. when the relative humidity was 100% on one side of the fabric and 50% on the other side. The coated fabrics withheld a 6-foot head of water.

Example 11

30 g. of organic pigment having the composition 70% N-isopropylacrylamide, 20% styrene, and 10% urea-formaldehyde-melamine resin was suspended in 200 g. butyl acetate. 70 g. of cellulose acetate butyrate and 21 g. dibutyl phthalate were dissolved in the suspension. The mixture was coated on polyethylene terephthalate and cotton fabrics. The coated fabrics transmitted water vapor at the rate of 31 g./m.$^2$/hr. when the relative humidity was 100% on one side of the fabric and 50% on the other side. The coated fabrics withheld a 6-foot head of water.

Example 12

15 g. of the organic pigment having the composition 55% N,N-dimethylacrylamide, 10% methacrylamide, 25% styrene, and 10% formaldehyde was suspended in 100 g. of butyl acetate. 30 g. of a low molecular polyester was dissolved in the butyl acetate. The polyester was prepared from adipic acid and ethylene glycol in the molar ratio of 9:10. The butyl acetate containing the organic pigment and polyester was stirred at 85° C. and 15.5 parts naphthalene-1,5-diisocyanate per 100 parts of polyester was added.

After heating the mixture for 30 minutes, cotton and nylon fabrics were coated with three coats. The coating was applied to give one ounce per square yard of dry coating, and the coated fabrics were heated at 150° C. for 5 minutes to cure the polyurethane. The coated fabrics transmitted water vapor at the rate of 39 g./m.$^2$/hr. when the relative humidity was 100% on one side of the fabric and 50% on the other side. The coated fabrics withheld a 6-foot head of water.

Example 13

30 g. of organic pigment which had a composition 55% N,N-dimethylacrylamide, 10% allyl alcohol, 10% tetramethylolmelamine and 25% methyl methacrylate was suspended in 100 g. of water by simple agitation. The suspended particles were 0.1 micron to 10 microns in diameter. 40 g. of zinc oxide, 2 g. of sulfur and 1 g. benzothiazolyl disulfide were added to the suspension. The suspension was made basic to pH 10 with sodium hydroxide solution. The resulting mixture was added to 140 g. of rubber latex, which was 50% acrylonitrile-butadiene copolymer.

The mixture was blended by slow agitation, and the resulting suspension adjusted to a suitable coating viscosity by the addition of one gram of ammonium caseinate. The adjusted coating mixture was coated on cellulose acetate, nylon, and cotton textile fabrics. Two coating operations were made and the increased weight of the fabrics due to the dry coating was 1 ounce per square yard. The fabrics were heated to 140° C. for 5 minutes. The coated fabrics showed a water vapor transmission rate of 35 g./m.$^2$/hr. The fabrics withheld a hydrostatic head of 6 feet of water.

Example 14

30 g. of organic pigment which has a composition of 60% N-isopropylacrylamide, 30% methyl methacrylate and 10% formaldehyde are suspended in 100 g. of water. The suspension is adjusted to pH 10 with sodium hydroxide solution and 5 g. of zinc oxide, 5 g. dioctyl phthalate and 3 g. antimony trioxide are added to the pigment suspension. This mixture is then added with gentle stirring to a 50% solids latex of polychloroprene. The final mixture is coated on glass-fiber textile fabrics to give a coating of 1 ounce per square yard. The coated fabric is heated to 140° C. for 30 minutes. The fabric is flame-resistant and has a water-vapor transmission rated at 33 g./m.$^2$/hr. The coated fabric withstands a 6-foot head of water.

The final latex is also coated on metal surfaces where it is cured by heating. The cured film is then stripped from the metal and is flexible and tough. The film transmits water vapor at the rate of 66 g./m.$^2$/hr., when the water vapor pressure on one side is 23.8 millimeters and 11.9 millimeters of Hg on the other side.

Example 15

50 g. of pigment which has the composition 35% vinylpyridine, 35% methacrylamide, 20% acrylic acid, and 10% formaldehyde is suspended in 300 g. of latex. The latex is composed of 30% polyvinyl butyral. The plasticizer is dibutyl sebacate and is present as 50% of the total polyvinyl butyral solids. 4 g. of urea-formaldehyde-melamine resin is added and the final mixture is coated on cotton and nylon fabrics. The coating on a dry basis weighs 1.5 ounces per square yard. The coated fabrics are heated to 120° C. for 5 minutes to cause the urea-formaldehyde-melamine resin to cross-link. The fabrics are waterproof to a 6-foot head of water and are able to transmit water-vapor at the rate of 31 g./m.$^2$/hr.

Example 16

Using the general method in Example 13, 20 g. of organic pigment which has the composition 50% methacrylamide, 40% 2-ethylhexylacrylate and 10% formaldehyde was mixed with 50 g. of rubber later. The latex contains 25 g. of acrylonitrile-butadiene copolymer. Fabrics coated with this material transmit water vapor at the rate of 36 g./m.$^2$/hr. The fabrics withstand a 6-foot head of water.

Example 17

Using the general method outlined in Example 15, 15 g. of the organic pigment which has a composition 55% N,N-dimethylacrylamide, 10% methacrylamide, 25% methyl methacrylate, and 10% dimethylolurea is mixed with 60 g. of an organosol which is 25% solids. The solid is the elastomer made by reacting 1 mole toluene diisocyanate with 1.0 mol 3,3'(2,2-dimethyltrimethylene dioxy) bis propylamine. The suspending liquid is 1,4-dioxane.

Textile fabrics are coated with the organosol. On a dry basis, 1 ounce per square yard of coating is applied in two coating operations. The coated material is heated to 140° C. for 5 minutes and is found to be waterproof for a 6-foot head of water. The fabric is able to transmit water-vapor at the rate of 42 g./m.$^2$/hr.

Example 18

30 g. of organic pigment which has the composition 65% N,N-dimethylacrylamide, 25% methyl methacrylate, and 10% cross-linking resin made from melamine and formaldehyde is suspended in 100 g. of toluene. The suspended particles are 0.1 micron to 10 microns in diameter. 4 g. of zinc oxide, 2 g. of sulfur, and 1 g. of benzothiazolyl disulfide is added to the suspension. 70 g. of rubber, which is composed of 70% butadiene-30% acrylonitrile, is dissolved in the suspension.

The final mixture is coated on cotton, cellulose acetate, and nylon textile fabrics. Two coating operations are made and the increased weight of the fabric due to the dry coating is 1 ounce per square yard. The coated fabric is heated to 140° C. for 5 minutes to cure the rubber. The coated fabric transmits water-vapor at the rate of 35 g./m.$^2$/hr. when the relative humidity on one side of the fabric is 100% and 50% on the other side. The coated fabric withholds a 6-foot head of water.

*Example 19*

The following materials are suspended in 70 g. of water:
(1) 50 g. organic pigment having the composition 45% methacrylamide, 45% N-isopropyl acrylamide, and 10% formaldehyde.
(2) 1.0 g. sulfur.
(3) 2.5 g. zinc oxide.
(4) 2.5 g. magnesium oxide.
(5) 1.0 g. thiocarbanilide.
(6) 1.0 g. N-phenyl-2-naphthylamine.
(7) 1.0 g. casein.

This suspension is mixed with 200 g. of polychloroprene latex composed of 50% solids.

The final mixture is coated on various textile fabrics to produce waterproof fabrics. The dry coating weight is approximately 1 ounce per square yard. These coated fabrics transmit water-vapor at the rate of 32 g./m.$^2$/hr. They are waterproof to a 6-foot head of water.

As used herein, the term cross-linked organic pigment containing amide groups is intended to describe a high polymer which is infusible at temperatures up to about 300° C. and insoluble in water or organic solvents, and in the elastomeric material. In order to obtain these characteristics, it is essential that a constituent be present, which serves as a cross-linking agent. This results in the formation of a polymeric pigment which is infusible and insoluble. From 1% up to about 20% of a cross-linking agent is employed. Examples of suitable cross-linking agents which can be employed include formaldehyde, paraformaldehyde, trioxane, and a formaldehyde condensation product of a compound having from 1-15 carbon atoms selected from the group consisting of urea, melamine, phenol, and alkylated (1-6 carbons per alkyl) derivatives thereof.

In our preferred embodiment the monoethylenically unsaturated aliphatic amide compounds which can be employed in the preparation of the polymeric pigments of this invention include the maleic amides, fumaric amides, itaconic amides, citraconic amides, and acrylamides wherein the nitrogen atoms of any of these amides and the alpha-position of acrylamide are joined to two members selected from the group consisting of lower alkyl and hydroxyalkyl radicals containing from 1 to 6 carbon atoms and a hydrogen atom.

Examples of these compounds include acrylamide, alphamethacrylamide, N-methyl-alpha-methacrylamide, N-isopropyl acrylamide, N,N-dimethylacrylamide, N-(2-hydroxyethyl-acrylamide, N-butyl-alpha-methacrylamide, N,N,N'N'-tetramethylmaleamide, fumaric amide, N,N'-diethylitaconic diamide, the corresponding amides and also the ester-amides of maleic, fumaric, itaconic and citraconic acids, and numerous other equivalent amides, ester amides and N-substituted derivatives thereof such as will be apparent to those skilled in the art. The alkyl radicals for the alcoholic portion of the ester amides of the dibasic amides can be advantageously derived from those alkyl radicals containing from 1 to 6 carbon atoms.

The method for polymerizing polymerizable monomers so as to prepare polymers or copolymers thereof with other monoethylenically unsaturated compounds as well as the methods for cross-linking such polymers and copolymers are well illustrated in the prior art with which this invention is not directly concerned.

In the practice of this invention, the polymer solution or suspension containing the cross-linking agent is sprayed into a heated chamber in a manner that produces fine drops of the polymer solution. The droplet is suspended in the heated air for a sufficient time to cause the reactive polymer to cross-link the polymer structure. The solvent or suspending liquid is also evaporated so that the final product is a very fine particle which is collected as a dry powder. The method of creating the fine droplet of the polymer solution is not critical but the size of the final dry polymer pigment is dependent on the size of the droplet as well as the concentration of the polymer solution. Polymer concentrations of from 5–50% sprayed into droplets of less than 20 microns in diameter will give particles of pigment which measure less than 10 microns in diameter. Extremely small particles are made by spraying dilute solutions of polymer into droplets less than 10 microns in diameter.

The cross-linking agent is added to the polymer solution before spraying. If formaldehyde is used, the formaldehyde may be added to the solution or it may be introduced as a gas into the heated chamber. In a few cases where higher temperatures are required to obtain complete reaction, the formaldehyde may be added by using a polymer of formaldehyde such as paraformaldehyde or trioxane. Other substances which are thermally unstable and produce formaldehyde may also be used. The amount of formaldehyde which reacts with the soluble polymer may be regulated by any of several methods. (1) The number of reactive sites on the polymer may be limited. (2) The time in the heated chamber may be varied. (3) The temperature of the droplet may be varied hence, the rate of reaction by using high or low boiling liquids or by varying the temperature of the heated chamber.

The cross-linked particles obtained by the techniques described above are then suspended in organic solutions of elastomers by either of two techniques. In the first technique, the dry particles are thoroughly mixed with organic solutions of elastomers such as neoprene, polyvinyl chloride, polyvinyl butyral, or GRS-type rubbers. The amount of hydrophilic polymer can vary from 10–60% based on the combined weight of the elastomer and the polymer particles. This mixture can be used in this condition, but it is usually preferred that the polymer particles should be swollen with water. The water is added to the above mixture directly and agitation causes contact with the hydrophilic polymer. The amount of water can vary from 10–300% of the weight of the hydrophilic polymer. An amount of water equal to the weight of the hydrophilic polymer is usually preferred.

Another technique for dispersing the hydrophilic polymer in the elastomer solution is similar to the above technique except that the water is added to the hydrophilic polymer first. In this case the amount of water is 50–150% based on the combined weight of the water and the polymer. After mixing the water and the polymer a paste or mobile dispersion is obtained depending on (1) the amount of cross-linking resin used in spray drying, (2) the amount of water used, and (3) the hydrophilic nature of the polymer particle. The dispersion is then added to an organic solution of an elastomer and thoroughly mixed. The elastomers and ranges of composition described in the first technique apply when this technique is used.

When the polymer for use as the polymeric pigment is made in an organic solvent, suitable catalysts include benzoyl peroxide, acetyl peroxide, cumene hydroperoxide, azo-bis-isobutyronitrile and the like as well as numerous other peroxy type catalysts.

Fabrics made from fibers of cotton, silk, viscose, cellulose esters (e.g., cellulose acetate), cellulose ethers, super-polyamides (e.g., nylon), glass, asbestos, flex, hemp, wool, polyesters, etc., can be employed in the preparation of coated or impregnated fabrics in accordance with the above process.

This is a continuation-in-part of applications U.S. Serial Nos. 701,715, filed December 10, 1957, now U.S. Patent 2,976,182 and 836,895, filed August 31, 1959.

The invention has been described in detail with particular reference to preferred embodiments thereof, but

We claim:
1. A process for preparing a water-resistant coated fabric which resists the passage of liquid water but permits transmission of water vapor comprising (A) forming a mixture of (1) 15–60% based on the dry coating of discrete particles having diameters of less than 10 microns which are essentially composed of a trioxane cross-linked insolubilized high copolymer of about 57 mole per cent fumaramide and about 43 mole percentage of vinyl acetate, with (2) an elastomer essentially composed of approximately equal parts by weight of polyvinyl butyral and dibutyl phthalate, said constituents (1) and (2) being carried in a liquid medium containing 5–80% solids content of the elastomer, (B) forming a coating of about 2.1 ounces of dry weight per square yard of said mixture on a supporting fabric essentially composed of cotton and (C) drying said coating to form a water-resistant coated fabric which transmits water vapor at the rate of at least about 35 grams per square meter per hour with a vapor pressure differential of about 11.58 mm. Hg pressure.

2. A water-resistant coated fabric prepared by the process defined by claim 1.

References Cited in the file of this patent
UNITED STATES PATENTS

| | | |
|---|---|---|
| 2,173,005 | Strain | Sept. 12, 1939 |
| 2,871,213 | Graulich et al. | Jan. 27, 1959 |
| 2,886,474 | Kine et al. | May 12, 1959 |
| 2,886,557 | Talet | May 12, 1959 |
| 2,893,970 | Caldwell et al. | July 7, 1959 |
| 2,976,182 | Caldwell et al. | Mar. 21, 1961 |